Inventor
Ernest G. Johansson

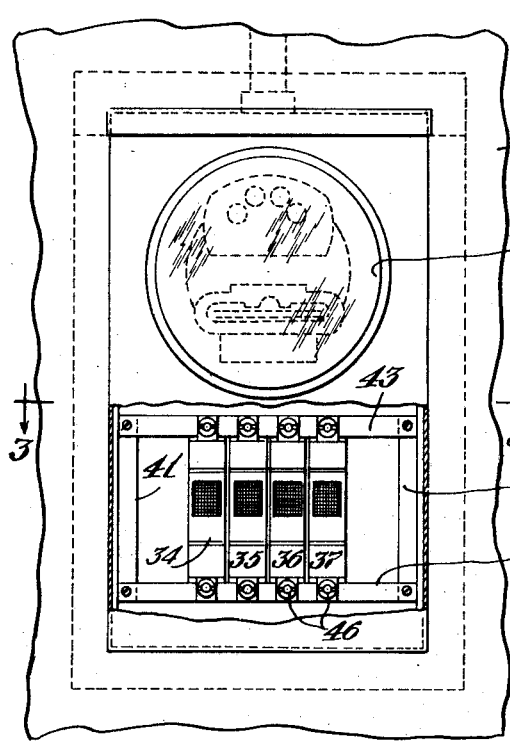
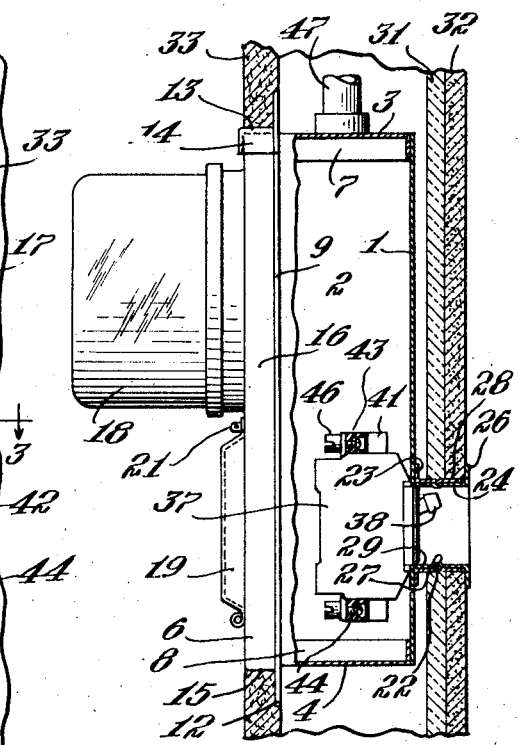
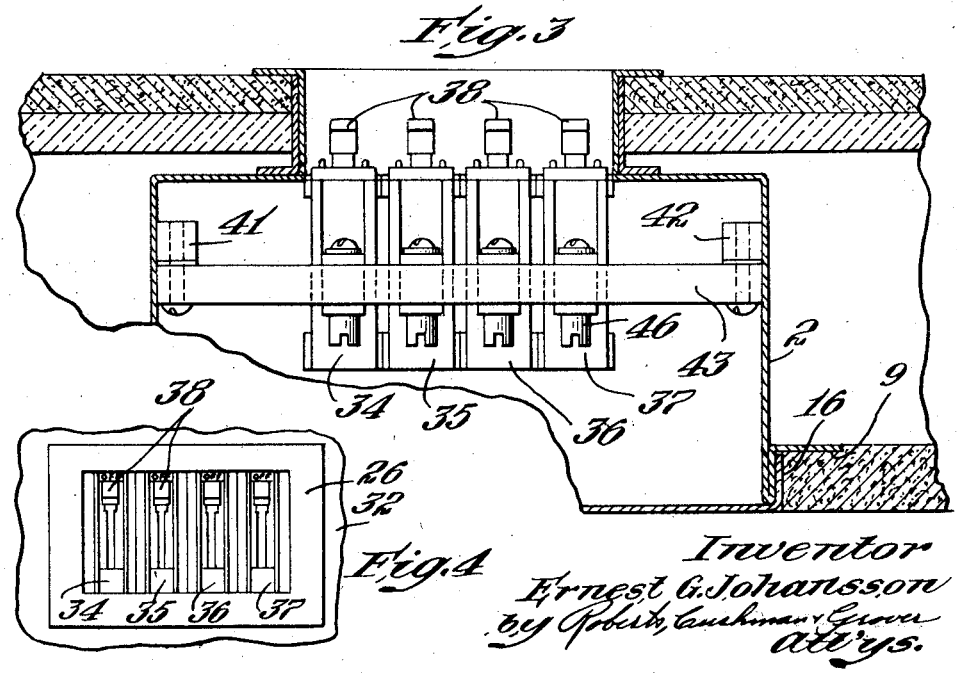

Patented July 15, 1947

2,423,938

UNITED STATES PATENT OFFICE 2,423,938

SERVICE CABINET

Ernest G. Johansson, Belmont, Mass., assignor to Anchor Manufacturing Company, Boston, Mass., a corporation of Massachusetts Application November 22, 1944, Serial No. 564,575

9 Claims. (Cl. 200—168)

This invention relates to service cabinets for electrical distribution centers in houses, office buildings et cetera. The cabinets may be used at main distribution centers, as for example at the location where the service wires enter a building, in which case the cabinet is usually constructed to accommodate a meter, or they may be used at branch distribution centers, as for example at various points in a house where one circuit is connected to several branch circuits.

Objects of the present invention are to provide a service cabinet which is simple and economical in construction, which is adapted to receive one or more switches for controlling the branch circuits, which may be mounted in a wall with only a small portion of its front side exposed on one side of the wall, which affords access to all of the interior parts from the opposite side of the wall for initial installation and servicing, which cannot be tampered with from its front side and which is durable and reliable in use.

In one aspect the present invention comprises a service cabinet having means for mounting the cabinet in the wall of a building with its front and rear sides facing from opposite sides of the wall, the cabinet having a large opening in its rear side and a small opening in its front side, the front side of the cabinet being closed except for the small opening so that it cannot be opened from the front, and means in the cabinet upon which a plurality of switches may be mounted through the large opening with their handles operable through the small opening, the latter opening being large enough to accommodate the handles but smaller than the switches so that the switches cannot be tampered with through the small opening. The cabinet may also have a cover for the small opening, together with means for detachably connecting the cover with the cabinet from the front side. Usually the small opening may be small enough to be covered by a plate no longer than an ordinary wall switch plate, so that the part of the cabinet visible from the front of the wall is very inconspicuous.

In another aspect the invention involves a cabinet for installation in a wall with its front and rear sides facing from opposite sides of the wall to house a switch with a handle for manual operation, the cabinet having means for mounting it in the wall with its front and rear sides facing from opposite sides of the wall, the cabinet having a large opening in its rear side and a small opening in its front side, in combination with a shield surrounding the small opening outside the cabinet, and means for mounting the switch in the cabinet through the large opening with the handle projecting through the small opening into the shield so that the switch, while mounted from the rear side of the cabinet, may be operated from the opposite side of the wall, the cross-sectional outline of the shield in the plane of the wall being much smaller than the corresponding outline of the cabinet so that only a small opening is required in the wall on the front side. While the shield may be mounted on the front of the wall and merely abut the cabinet around the small opening, preferably the shield is in the form of an extension fastened to the cabinet. In the preferred embodiment the cabinet has a cover for the end of the extension and means for detachably connecting the cover with the extension from the front side. Preferably the cover telescopes into the extension and the cover has a flange overlapping the front end of the extension.

For the purpose of illustration typical embodiments of the invention are shown in the accompanying drawings in which Fig. 1 is a rear elevation of a main distribution cabinet mounted in a wall, a portion of the rear wall of the cabinet being broken away;

Fig. 2 is a side elevation showing parts broken away and showing the wall in section;

Fig. 3 is a section on line 3—3 of Fig. 1;

Fig. 4 is a front view;

Figure 5:
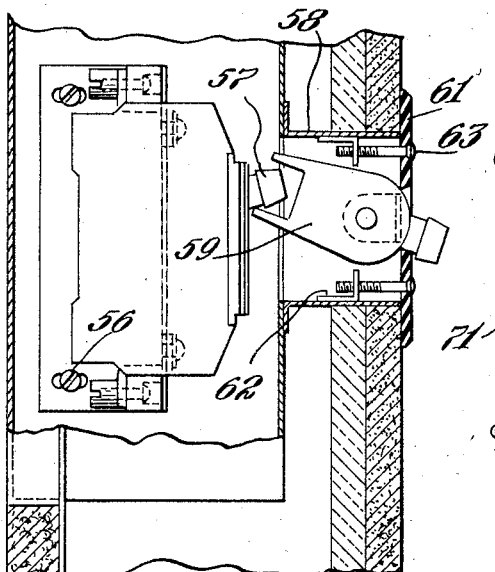
Fig. 5 is a vertical section of a modification.

The particular embodiment of the invention shown in Figs. 1 to 4 comprises a main distribution cabinet having a front 1, sides 2, top 3, bottom 4 and back 6. The front and sides are integral with each other, and the top and bottom have flanges 7 and 8 which telescope into the cabinet and are welded to the front and sides. At the rear the sides 2 are folded forwardly and thence bent outwardly to form flanges 9 (Fig. 3). Welded to the rear edge of the bottom 4 is an angle iron 11 which affords a bottom flange 12 in the same plane with the side flanges 9. The top 3 has welded to it an angle iron 13 which is similar but which has end walls 14. The rear cover 6 has side flanges 16 and a bottom flange 15 but no flange at the top. The cover 6 has an opening 17 to receive meter 18 which is preferably of the plug-in type. The cover 6 also has an opening closed by a door 19 pivotally mounted on the cover at 21. To apply the cover to the cabinet its upper end is slipped upwardly under the part 13 with the lower end inclined outwardly away from the cabinet and then, after the cover has been slipped up under the part 13, the lower end of the cover is swung into the position shown in the drawings where its side and bottom flanges overlap the margins of the cabinet. The cover may be locked in closed position in any suitable manner, as for example by the mechanism disclosed in my Patent 2,329,349 or my application Serial No. 469,817. Likewise the door 19 may be sealed in closed position in any suitable way.

On its front side the cabinet has a small opening and an extension 22 surrounding the opening, the extension having rear flanges 23 welded to the front 1. Telescoping into the extension is a cover 24 having a flange 26 overlapping the outer edge of the extension. The telescoping parts 22 and 24 may have interfitting ribs and grooves 27 which snap together to hold the cover in place. The extension 22 may also have one or more weakened lines 28 extending around its periphery so that the outer edge of the extension may be broken off to adjust the length of the extension to the thickness of the wall in which the cabinet is mounted. The cover 24 may also have one or more similar lines 29 extending around its periphery to adjust its length to the length of the extension.

As shown in Figs. 2 and 3 the installation is applied to the outer wall of a house comprising lathing 31, interior plaster 32 and exterior stucco 33 with the usual frame members not shown between the lathing 31 and the exterior stucco 33. Before the lathing, plaster and stucco are applied, the cabinet is mounted in the wall by securing the flanges 9 et cetera to the framework of the house, after which the lathing, plaster and stucco may be applied as indicated. After the plaster has been applied the cover 24 may be telescoped into the extension 22 to cover the edge of the extension and the joint between the plaster and the extension.

Inside the cabinet opposite the door 19 means is provided for mounting a row of switches 34, 35, 36 and 37, which may be of the well-known type which kick open in response to an overload and which may be closed by handles 38. The means for supporting the switches comprise upright strips 41 and 42 secured to the side walls 2 and insulating cross bars 43 and 44 secured to the upright strips. The switches are secured to the cross bars 43 and 44 by means of screws 46 extending through clips fast to the switches and thence extending into the cross bars 43 and 44. As shown in Figs. 2, 3 and 4 the parts are so arranged that when the switches are mounted in position through the opening covered by door 19 the casings of the switches substantially close the opening into the extension 24 and the handles 38 project into the space within the extension.

While the panel may be connected in various ways the usual way is to connect the service wires, which enter the cabinet through the inlet 47, to the contacts engaged by the plug-in meter and thence to the switches 34 to 37 and thence to the various branch circuits.

Figure 6:
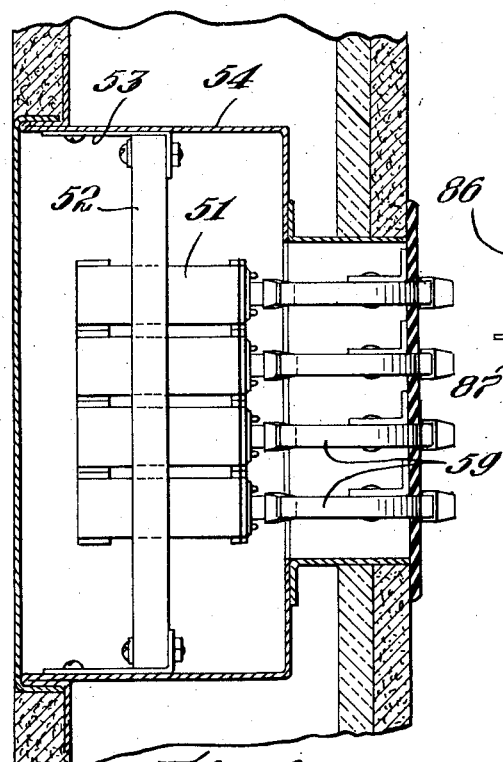
Fig. 6 is a horizontal section of the same modification.

The modification shown in Figs. 5 and 6 is similar to the embodiment shown in Figs. 1 to 4. However the switches 51 are mounted on insulating cross bars 52 which in turn are mounted on brackets 53 adjustably secured to the sides 54 of the cabinet by means of screws 56 extending through slots in the brackets and threading into the sides of the cabinet. Instead of the switch handles 57 projecting into the extensions 58 they are arranged to be operated by levers 59 pivotally mounted on a cover plate 61 which is secured to bracket 62 on the inside of the extension by means of screws 63.

Figure 7:
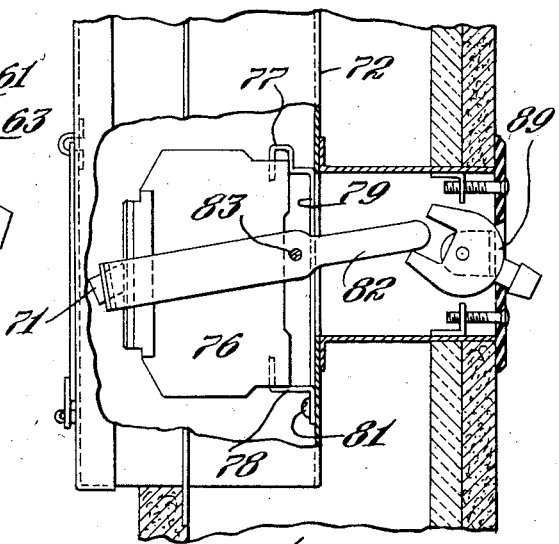
Fig. 7 is a vertical section of another modification.
Figure 8:
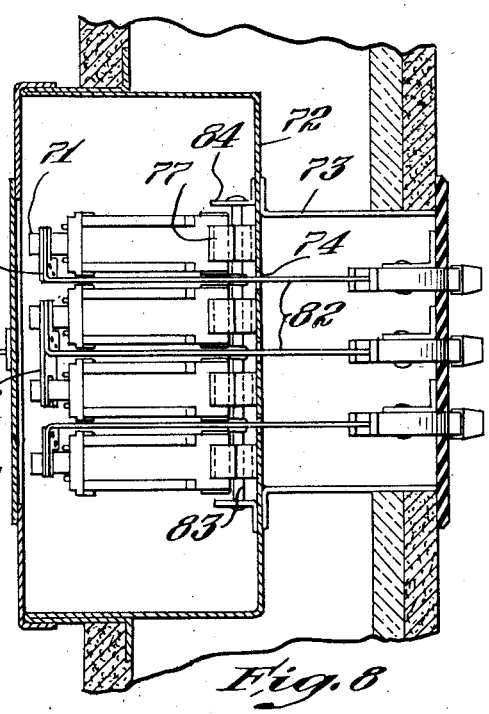
Fig. 8 is a horizontal section of the latter modification.

In the modification shown in Figs. 7 and 8 the switches are mounted in reversed position with their handles 71 projecting rearwardly instead of forwardly. In this case the front wall 72 of the cabinet extends continuously across the extension 73 except for narrow slots 74. The switches 76 are mounted on the front wall 72 by means of upper and lower fingers 77 and 78 hooking into recesses in the switch cases. The upper fingers 77 have depending portions 79 welded to the front 72 between the slots 74 and the lower fingers 78 are secured by means of screws 81. To mount a switch in position it is first moved up against the upper hook 77 and the lower hook 78 is then applied by means of the screw 81. Extending through the slots 74 are levers 82 which are pivoted on a rod 83 mounted in brackets 84. The rear end of each lever is bent at right angles and mounted on the bent end is a plate 86 having an opening to receive the switch handle 71. If two switches are to be operated with one handle the plate mounted on the rear end of the handle surrounds two handles instead of one as indicated in Fig. 8. By making the plates 86 detachable from the rear the levers 82 may be permanently installed and the switches may thereafter be installed from the rear by removing the plates 86 and 87 while installing the switches. The forward ends of the levers 82 are operated by auxiliary levers 89 like the levers 59 in Figs. 5 and 6.

From the foregoing it will be evident that only a small part of the cabinet is visible from one side of the wall (Fig. 4). While the entire rear side of the cabinet is visible from the far side of the wall, the cabinet may be located in a place where this is of no consequence. For example in the case of a main distribution panel having a meter the cabinet may be mounted in an outside wall of the house with the back and meter outside the house and only the small switch extension showing on the inside of the house. And in the case of a branch distribution panel, having only the switches and no meter, the cabinet may be mounted in a closet or some other place where the appearance of the rear side of the cabinet is of little consequence, only the small switch extension being visible on the outside of the closet wall. It should also be understood that the construction is such that the switches cannot be removed from the front side and the interior wiring cannot be tampered with from the front side. The rear side may be sealed in the usual way to prevent unauthorized access.

It should be understood that the present disclosure is for the purpose of illustration only and that this invention includes all modifications and equivalents which fall within the scope of the appended claims.

I claim:

1. A service cabinet for housing a plurality of switches controlling different load circuits of a building, the cabinet having means for mounting it in the wall of the building with its front and rear sides facing from opposite sides of the wall, the cabinet having a large opening in its rear side and a small opening in its front side, the front side of the cabinet being permanently closed except for said small opening so that it cannot be opened from the front and means in the cabinet upon which said switches may be mounted through said large opening with their handles operable through said small opening, the latter opening being large enough to accommodate said handles but smaller than the switches so that the switches cannot be tampered with through the small opening.

2. A service cabinet for housing a plurality of switches controlling different load circuits of a building, the cabinet having means for mounting it in the wall of the building with its front and rear sides facing from opposite sides of the wall, the cabinet having a large opening in its rear side and a small opening in its front side, the front side of the cabinet being permanently closed except for said small opening so that it cannot be opened from the front, means in the cabinet upon which said switches may be mounted through said large opening with their handles operable through said small opening, the latter opening being large enough to accommodate said handles but smaller than the switches so that the switches cannot be tampered with through the small opening, a cover for the small opening, and means for detachably connecting the cover with the cabinet from the front side.

3. A service cabinet for installation in a wall with its front and rear sides facing from opposite sides of the wall to house a switch having a handle for manual operation, the cabinet having a large opening in its rear side and a small opening in its front side, a shield surrounding the small opening outside the cabinet, means for mounting the switch in the cabinet through the large opening with said handle projecting through said small opening into said shield so that the switch, while mounted from the rear side of the cabinet, may be operated from the opposite side of the wall, the cross-sectional outline of the shield in the plane of the wall being much smaller than the corresponding outline of the cabinet so that only a small opening is required in the wall on the front side.

4. A service cabinet for installation in a wall with its front and rear sides facing from opposite sides of the wall to house a switch having a handle for manual operation, the cabinet having a large opening in its rear side and a small opening in its front side, a shield surrounding the small opening outside the cabinet, means for mounting the switch in the cabinet through the large opening with said handle projecting through said small opening into said shield so that the switch, while mounted from the rear side of the cabinet, may be operated from the opposite side of the wall, the cross-sectional outline of the shield in the plane of the wall being much smaller than the corresponding outline of the cabinet and too small to permit removal of the switch therethrough.

5. A service cabinet for installation in a wall with its front and rear sides facing from opposite sides of the wall to house a switch having a handle for manual operation, the cabinet having an extension on the front side to project substantially to the face of the wall, and means for mounting the switch in the cabinet from the rear side with said handle projecting into said extension so that the switch, while mounted from the rear side of the cabinet, may be operated from the opposite side of the wall, the cross-sectional outline of the extension in the plane of the wall being much smaller than the corresponding outline of the cabinet so that only a small opening is required in the wall on the front side.

6. A service cabinet for installation in a wall with its front and rear sides facing from opposite sides of the wall to house a switch having a handle for manual operation, the cabinet having an extension on the front side to project substantially to the inner face of the wall, and means for mounting the switch in the cabinet from the rear side with said handle projecting into said extension so that the switch, while mounted from the rear side of the cabinet, may be operated from the opposite side of the wall, the cross-sectional outline of the extension in the plane of the wall being much smaller than the corresponding outline of the cabinet and too small to permit removal of the switch therethrough.

7. A service cabinet for installation in a wall with its front and rear sides facing from opposite sides of the wall to house a switch having a handle for manual operation, the cabinet having an extension on the front side to project substantially to the face of the wall, means for mounting the switch in the cabinet from the rear side with said handle projecting into said extension so that the switch, while mounted from the rear side of the cabinet, may be operated from the opposite side of the wall, the cross-sectional outline of the extension in the plane of the wall being much smaller than the corresponding outline of the cabinet so that only a small opening is required in the wall on the front side, a cover for the end of the extension, and means for detachably connecting the cover with the extension from the front side of the wall.

8. A service cabinet for installation in a wall with its front and rear sides facing from opposite sides of the wall to house a switch having a handle for manual operation, the cabinet having an extension on the front side to project substantially to the inner face of the wall, means for mounting the switch in the cabinet from the rear side with said handle projecting into said extension so that the switch, while mounted from the rear side of the cabinet, may be operated from the opposite side of the wall, the cross-sectional outline of the extension in the plane of the wall being much smaller than the corresponding outline of the cabinet so that only a small opening is required in the wall on the front side, and a cover for the end of the extension, the cover telescoping and extension telescoping together from opposite sides of the wall and the cover having a flange overlapping the front end of the extension.

9. A service cabinet for housing a plurality of switches controlling different load circuits of a building, means for mounting the cabinet in the wall of the building with its front and rear sides facing from opposite sides of the wall, the cabinet having a large opening in its rear side and a small opening in its front side, means in the cabinet upon which said switches may be mounted through said large opening with their handles operable through said small opening, the latter opening being large enough to accommodate said handles but smaller than the switches so that the switches cannot be tampered with through the small opening, and an extension on the front side of the cabinet around the small opening, the cross-sectional outline of the extension in the plane of the wall being much smaller than the corresponding outline of the cabinet so that only a small opening is required in the wall on the front side.

ERNEST G. JOHANSSON.

REFERENCES CITED

The following references are of record in the file of this patent:

UNITED STATES PATENTS

| Number | Name | Date |
|---|---|---|
| 2,323,252 | Sparks | June 29, 1943 |
| 1,921,419 | Lewis | Aug. 8, 1933 |